United States Patent [19]
Kitazawa et al.

[11] 3,834,519
[45] Sept. 10, 1974

[54] MAGNETIC CONVEYOR

[75] Inventors: Yoshio Kitazawa; Ikuji Ariyoshi; Masato Nagawa; Kenji Terai, all of Kitakyushu, Japan

[73] Assignee: Nippon Steel Corporation, Tokyo, Japan

[22] Filed: Apr. 14, 1972

[21] Appl. No.: 243,938

[30] Foreign Application Priority Data
Apr. 15, 1971 Japan.............................. 46-28956

[52] U.S. Cl.............................. 198/41, 198/33 AB
[51] Int. Cl............................................. B65g 47/24
[58] Field of Search..... 198/41, 33 AB; 271/DIG. 3, 271/63 A, 202, 193; 214/6 DS; 221/15, 21

[56] References Cited
UNITED STATES PATENTS
3,109,532  11/1963  Milan.................................. 198/41
3,468,406  9/1969  Spodig................................. 198/41
3,610,402  10/1971  Tavernier............................. 198/41

FOREIGN PATENTS OR APPLICATIONS
209,840  1/1960  Germany............................. 226/15

Primary Examiner—Richard A. Schacher
Assistant Examiner—Douglas D. Watts
Attorney, Agent, or Firm—Toren & McGeady

[57] ABSTRACT

A magnetic conveyer comprising a pair of pulleys, a belt around the pair of pulleys, a plurality of magnetic rail pieces fixedly arranged inside the belt, and a magnet rail extending across the width of the belt and rotatably supported at a supporting point so that it may taken any desirable angle to the axial line of the conveyer.

3 Claims, 12 Drawing Figures

MAGNETIC CONVEYOR

The present invention relates to a magnetic conveyer used for attracting and carrying steel sheets and further for lapping the steel sheets in its carrying course in production lines such as a shearing line of steel sheets.

Recently, the demand for speed-up of steel strip treating equipments is increasing more and more, and it has become possible to roll a very thin steel sheet as of about 0.1 mm thickness and demands for such very thin sheets are very likely to increase. And a high-speed shearing machine has been developed for shearing steel strips.

In order to meet the above tendencies, the present invention has been made to carry very thin steel sheets at high speed or lap them with accuracy and correct the inclination of the steel sheets to eliminate troubles at the piler.

Figure 1:
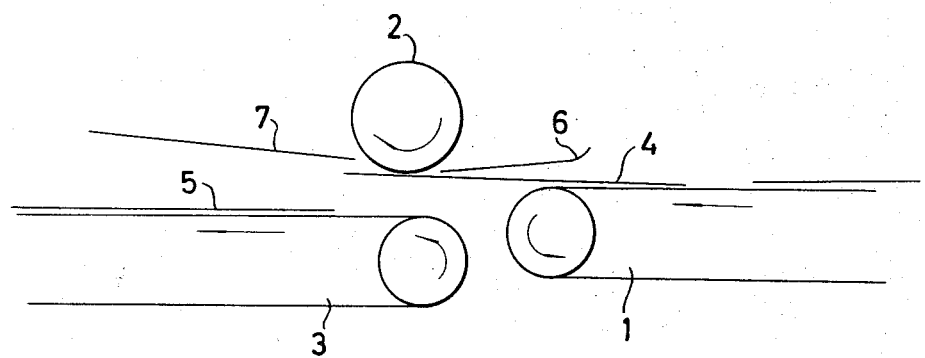

As a conventional lapping machine a magnetic roll called as a lapping roll as shown in FIG. 1 has been used.

According to this conventional machine, the steel sheet 4 carried forward by a belt conveyor 1 is attracted to the lower side of a magnetic roll 2 and is cast onto a belt conveyor 3 at a speed corresponding to the rotation rate of the roll. Meanwhile a preceeding sheet 5 is moving in the direction shown by the arrow at the same speed as the blet conveyer 3. If the speed of the belt conveyer 3 is made considerably slow as compared with the casting speed of the sheet 4, the top end of the sheet 4 can be lapped onto the rear end of the sheet 5 which the sheet falls on the conveyer 3. 6 is a guide plate for preventing the end of the sheet from hitting the magnetic roll 2. 7 is a guide plate for preventing the jump-up of the rear end of the sheet from the magnetic roll 2. In this conventional system, due to the small contacting area between the sheet and the magnetic roll, the force to restrict the sheet is weak so that the top end of the sheet warps or inclines or deviates from a proper position due to the resistance of the air in case when the sheet is very thin or the conveyer speed is high, thus causing hitting of the succeeding sheet to the preceding sheet and prohibiting a proper lapping of the sheets.

Further, the sheet very often contacts the guide plates 6 and 7 provided respectively at the front and rear of the magnetic roll 2 and is damaged thereby.

A carrying machine composed of a magnetic rail arranged in a belt conveyer has been developed, but this machine has a vital defect that the inclination or deviation of the sheet caused during the carrying can not be corrected.

The present invention provides an attracting and carrying machine which can correct the inclination or deviation of the sheet during the carrying of the sheet, and which machine comprising a magnetic member provided in a belt conveyer, which is variable in its angle to the axial line of the belt conveyer.

Figure 3:
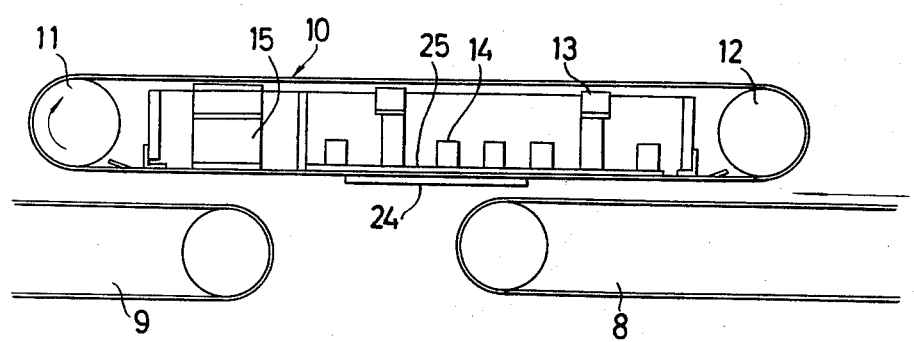
Figure 2:
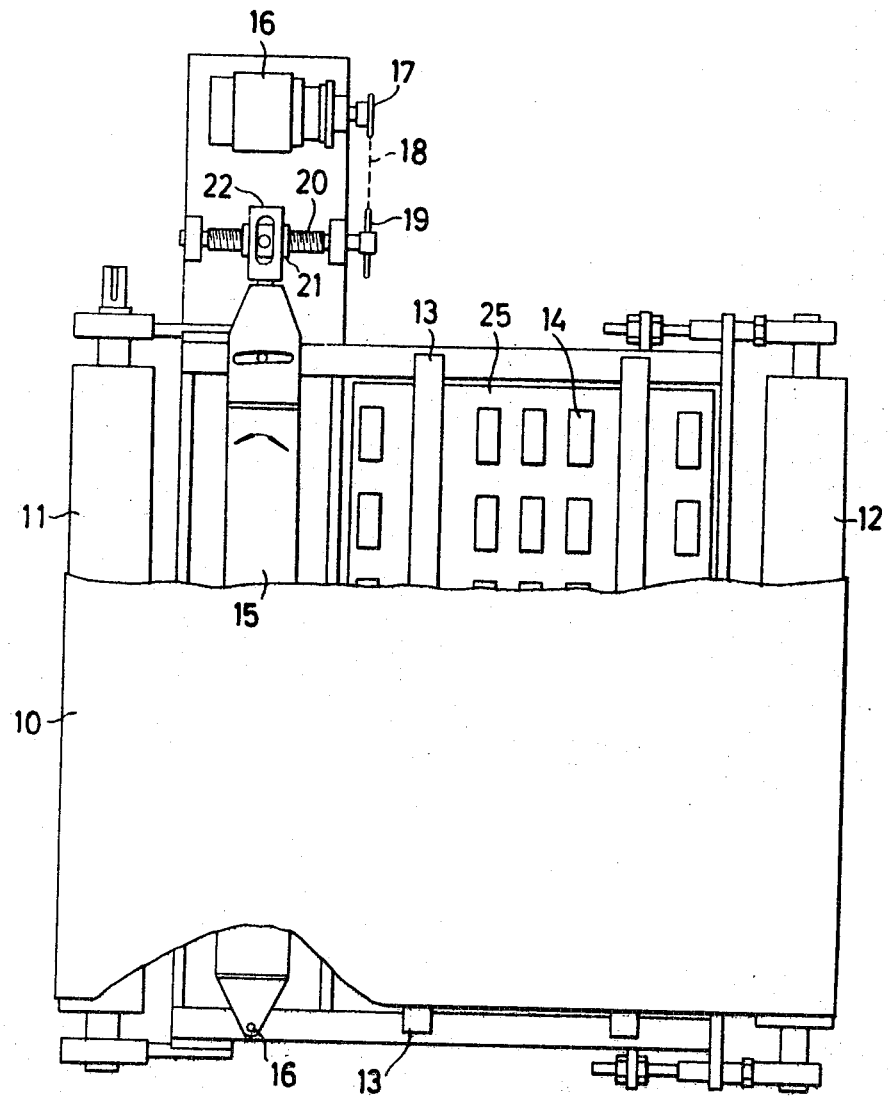

One embodiment of the present invention shall be explained referring to FIGS. 2 and 3. A belt 10 is driven in the direction marked by an arrow by a driving pulley 11. 12 is an idle pulley for adjusting the belt tension, 13 is a frame for the conveyer. The sheet 24 carried by the belt conveyer is attracted by magnetic rails 14 and 15 arranged along the lower side of a lapping conveyer 10 and fed onto a belt conveyer 9 by the movement of the belt 10. For lapping the sheets, the speed of the lapping conveyer 10 and that of the belt conveyer 9 are given appropriate difference in a similar way as in case of the lapping roll just mentioned above. The main portion of the magnetic rail 15 is composed of any suitable magnetic material, and one end of the magnetic rail is supported at a supporting point 16 so that the angle of the magnetic rail 15 can be adjusted around the supporting point 16. The supporting point may be positioned at any desirable position such as the center of the magnetic rail.

The adjustment of the angle of the magnetic rail is effected by rotating a screw shaft 20 through a chain wheels 17 and 19 and a chain 18 by a motor 16 to move right and left a nut 21 engaged with the screw shaft 20 so as to change the position of the other end 22 of the magnetic rail 15.

Figure 4:
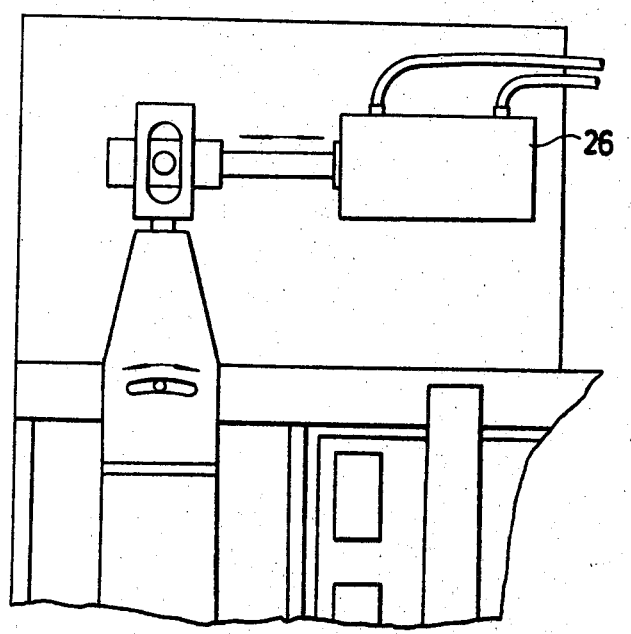
Figure 5A:
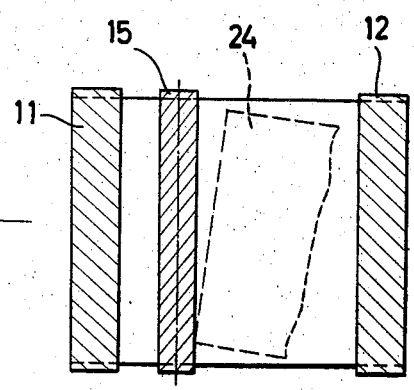
Figure 5B:
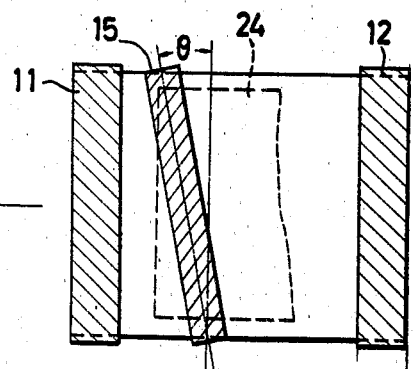
Figure 5C:
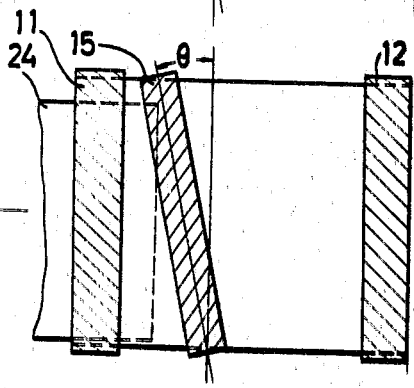
Figure 5D:
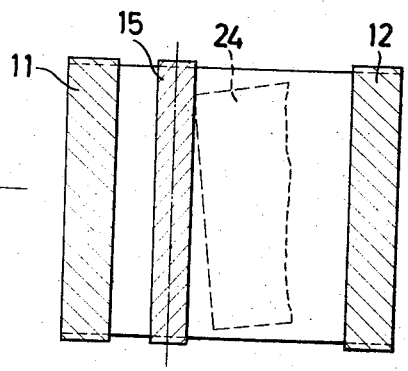
Figure 5E:
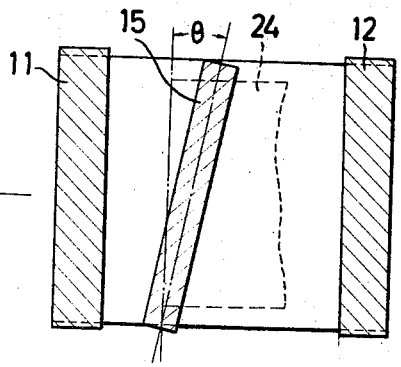
Figure 5F:
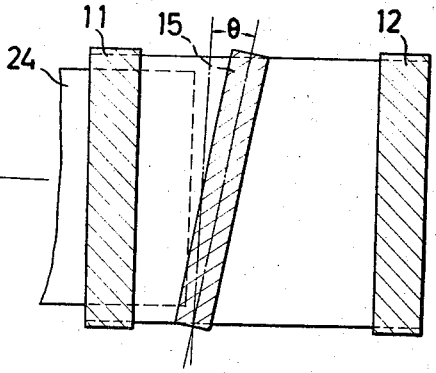
Figure 5G:
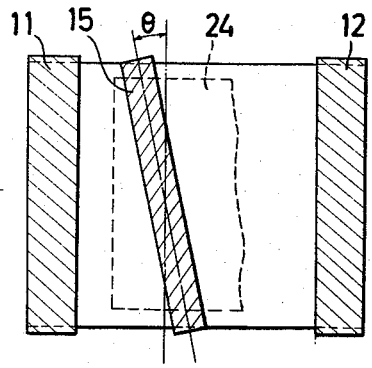
Figure 5H:
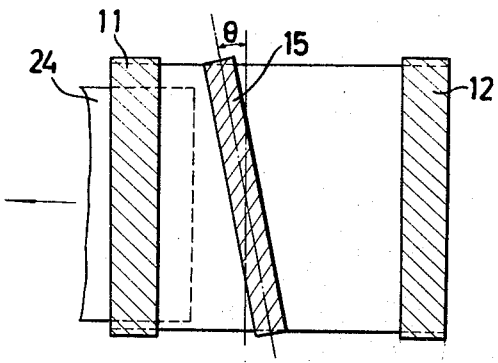

However, the movement of the magnetic rail 15 may be done by other means such as a cylinder shown in FIG. 4, and both ends of the magnetic rail may be moved in an opposite direction when the supporting point is positioned at a position other than the end of the magnetic rail.

In the embodiment shown in FIGS. 2 and 3, a plurality of magnetic rail pieces 14 are arranged at the starting portion of the belt on its back side directly or through a magnetic plate 25.

By the adjustment of the angle of the magnetic rail 15, the inclination or deviation of the sheet carried by the belt conveyer 8 is corrected and can be straightforwardly fed on the belt conveyer 9.

FIG. 5 shows the principle of the correction of the inclination or deviation of the sheet according to the present invention.

FIGS. 5-A, 5-B and 5-C show the process in which the sheet is initially inclined right-side (A) and this inclination is corrected to the straight position (B, C), while FIGS. 5-D, 5-E, and 5-F shows the process in which the sheet is initially inclined left-side (D) and is corrected to the straight position (E, F). FIGS. 5-G, 5-H, relate to an embodiment in which the supporting point is positioned at the center of the magnetic rail. The principle in this case is just same as in FIGS. 5-A to 5-F.

When the magnetic rail 15 is inclined by an angle $\theta$ respect to the forwarding direction of the sheet, there is caused unbalance in the force to push forward the sheet so that a moment is caused to give rotation to the sheet, and this moment changes the inclination angle of the sheet. Meanwhile when the magnetic rail is positioned at right angle to the forwarding direction of the sheet, the force of the belt conveyer to push forward sheet is balanced right and left so that the sheet is fed in its initial state.

In the above embodiment of the present invention, the magnetic rail pieces 14 are fixed and only the angle of the magnetic rail 15 is made variable. The present invention should not be limited to the embodiment, and similar results can be obtained by switching-over or arrangement of the magnets.

The present magnetic conveyor can be used in a similar way as the conventional lapping machine, but has remarkable advantages that a strong force for restricting the sheet is attained due to the large contacting area with the sheet, the troubles accompanying the conventional lapping roll are eliminated and a thin guage material can be passed at a high speed, thus enhancing production per unit time.

Of course, the present machine can be used for a simple carrying operation.

What is claimed is:

1. A conveyer assembly for transporting magnetizable objects comprising a pair of spaced pulleys mounted for rotation about generally parallel axes, a conveyer belt extending about said pulleys to be driven thereby along a conveying path in a predetermined direction extending linearly between the said pulleys, magnetic means extending transversely across said path at a location between said pulleys, said magnetic means being arranged to magnetically hold against said belt objects to be transported thereby, and means for adjustably mounted said magnetic means for pivotal motion about an axis extending in a direction perpendicular to both said predetermined conveying direction and said axes of said pulleys, said magnetic means comprising a magnetic rail formed as a generally longitudinal member having a pair of ends, said assembly including means for adjustably mounting said rail for pivotal motion about at least one of said ends.

2. An assembly according to claim 1 wherein said magnetic means is positioned at a forward portion of said conveyor belt taken in the direction of said conveying path.

3. An assembly according to claim 1 further comprising a plurality of magnetic rail pieces located between said pulleys at positions separate from said magnetic rail, and a magnetic plate positioned between said conveyor belt and said plurality of magnetic rail pieces.

* * * * *